United States Patent
Liu et al.

(10) Patent No.: US 9,356,729 B2
(45) Date of Patent: May 31, 2016

(54) COMMUNICATION DEVICE AND METHOD FOR CONFIGURING DATA TRANSMISSION

(71) Applicant: Realtek Semiconductor Corp., HsinChu (TW)

(72) Inventors: Der-Zheng Liu, Hsinchu County (TW); Kuang-Yu Yen, Hsinchu County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 0 days.

(21) Appl. No.: 14/248,347

(22) Filed: Apr. 9, 2014

(65) Prior Publication Data

US 2014/0307827 A1 Oct. 16, 2014

(30) Foreign Application Priority Data

Apr. 10, 2013 (TW) ................ 102112778 A

(51) Int. Cl.
*H04L 1/00* (2006.01)
*G06F 13/38* (2006.01)

(52) U.S. Cl.
CPC ............ *H04L 1/0003* (2013.01); *H04L 1/0033* (2013.01); *G06F 13/385* (2013.01); *G06F 2213/0026* (2013.01); *G06F 2213/0042* (2013.01)

(58) Field of Classification Search
CPC ............... G06F 2213/0026; G06F 2213/0042; G06F 13/387; G06F 1/266; G06F 1/3203; G06F 13/385; G04F 13/385; H04L 69/18; H04W 88/06; H04W 28/22; H04W 52/0219; Y02B 60/1235; H04N 1/00896
USPC .......................................... 375/295
See application file for complete search history.

(56) References Cited

U.S. PATENT DOCUMENTS

| 6,898,198 | B1 | 5/2005 | Ryan |
| 7,411,929 | B2 * | 8/2008 | Ling et al. ...................... 370/334 |
| 7,461,195 | B1 * | 12/2008 | Woodral ....................... 710/313 |
| 7,668,224 | B2 | 2/2010 | Hocevar |
| 7,921,233 | B2 * | 4/2011 | Chung ................. G06F 13/387 439/638 |
| 2005/0163242 | A1 * | 7/2005 | Ungerboeck ................. 375/261 |
| 2006/0206648 | A1 * | 9/2006 | Gupta et al. .................. 710/302 |
| 2009/0270065 | A1 * | 10/2009 | Hamada et al. ............ 455/404.1 |
| 2011/0064023 | A1 * | 3/2011 | Yamamoto .......... H04W 72/048 370/328 |
| 2011/0099287 | A1 * | 4/2011 | Manor .................. H04W 28/22 709/233 |
| 2011/0231685 | A1 * | 9/2011 | Huang .................. G06F 1/3203 713/321 |
| 2012/0060043 | A1 * | 3/2012 | Kim ...................... G06F 1/3209 713/320 |
| 2012/0210032 | A1 * | 8/2012 | Wang et al. .................... 710/260 |
| 2012/0243156 | A1 * | 9/2012 | Cheng ...................... 361/679.02 |

FOREIGN PATENT DOCUMENTS

CN 201281850 * 7/2009 ............ G06F 11/267

* cited by examiner

*Primary Examiner* — Sophia Vlahos
(74) *Attorney, Agent, or Firm* — Winston Hsu; Scott Margo

(57) ABSTRACT

A communication device includes a plurality of host control interfaces, an interface detector, and a transmitter. The plurality of host control interfaces selectively connect to a connection interface of a host. The interface detector is coupled to the plurality of host control interfaces and utilized for determine an interface specification of the connection interface to generate a detection result. The transmitter is coupled to the interface detector and supports a plurality of transmission power levels. The transmitter is utilized for determining a plurality of transmission configurations, and selecting one of the transmission configurations to communicating with a receiver, wherein each of the transmission configurations determines a transmission power level configuration of the transmitter.

17 Claims, 3 Drawing Sheets

COMMUNICATION DEVICE AND METHOD FOR CONFIGURING DATA TRANSMISSION

BACKGROUND OF THE INVENTION

1. Field of the Invention

The disclosed embodiments of the present invention relate to a communication system.

2. Description of the Prior Art

In conventional communication systems, the transmitter designs decide related transmission configurations, including the modulation and coding scheme (MCS), the spatial stream number, the transmission power level, etc., based on the channel quality, so as to achieve the best utilization of the channel bandwidth.

A transmitter based communication device is usually utilized for acting as a data transmission interface in a system, and connected to a host via a Host Control Interface (HCI). In different applications, communication devices may employ host control interfaces which are designed based on different specifications. For instance, in a notebook application, the communication device may employ the Peripheral Component Interconnect Express (PCI-E) based host control interface for communicating with the host. In a smart phone application, the communication device may employ the Secure Digital Input/Output (SDIO) based host control interface for communicating with the host. In addition, if the communication device is an interface for connecting external devices, the communication device may employ the Universal Serial Bus (USB) based host control interfaces for communicating with the host. Therefore, the conventional communication device usually possesses host control interfaces complying with multiple specifications.

Due to diversity of the host control interface, compatibility has to be taken into consideration at the design phase of communication devices. For example, a communication device with a USB 3.0 based host control interface is required to identify host's connection interfaces complying with different USB versions such as USB 1.1, 2.0, and 3.0, or identify host's connection interfaces complying with the USB specification and the PCI-E specification. However, the interface specifications of host's different connection interfaces have different power consumption limits. For instance, in the USB 2.0 specification, the permitted power consumption is under 2.5 W for peripherals; however, in the USB 3.0 specification, the permitted power consumption is under 4.5 W. That is to say, a communication device which communicates with a host through a USB 2.0 based host control interface has a power consumption limit of 2.5 W, while a communication device which communicates with a host through a USB 3.0 based host control interface has a power consumption limit of 4.5 W.

As can be readily known from the foregoing, due to diversity of the host control interface, there has to be a mechanism implemented in the communication device to configure various transmission settings by simultaneously referring to different specifications of host control interfaces and the channel quality.

SUMMARY OF THE INVENTION

To solve the above-mentioned problem, a communication device for configuring data transmission (e.g., transmission power level and other transmission settings) based on an interface specification of a host to which the communication device connects is disclosed in the present invention. The present invention mainly refers to a power limit as defined in the interface specification for determining a plurality of feasible transmission configurations. Then, a preferred transmission configuration is selected from the transmission configurations according to channel quality. After that, a transmitter performs data transmission according to the preferred transmission configuration.

According to an embodiment of the present invention, a communication device is disclosed. The communication device includes a plurality of host control interfaces, an interface detector, and a transmitter. The plurality of host control interfaces is arranged for selectively connecting to a connection interface of a host. The interface detector is coupled to the host control interfaces, and is arranged for determining an interface specification of the connection interface to generate a detection result. The transmitter is coupled to the interface detector and complying with a plurality of transmission power levels, and is arranged for determining a plurality of transmission configurations according to the detection result and selecting one from the transmission configurations for data transmission with a receiver, wherein each transmission configuration determines a transmission power level configuration of the transmitter.

According to another embodiment of the present invention, a method for configuring data transmission is disclosed. The method includes: connecting to a connection interface of a host; determining an interface specification of the connection interface to generate a detection result; determining a plurality of transmission configurations according to the detection result, wherein the transmission configurations are used for configuring a transmitter complying with a plurality of transmission power levels; and selecting one from the transmission configurations to configure the transmitter, so as to enabling the data transmission between the transmitter and a receiver, wherein each transmission configuration determines a transmission power level configuration of the transmitter.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
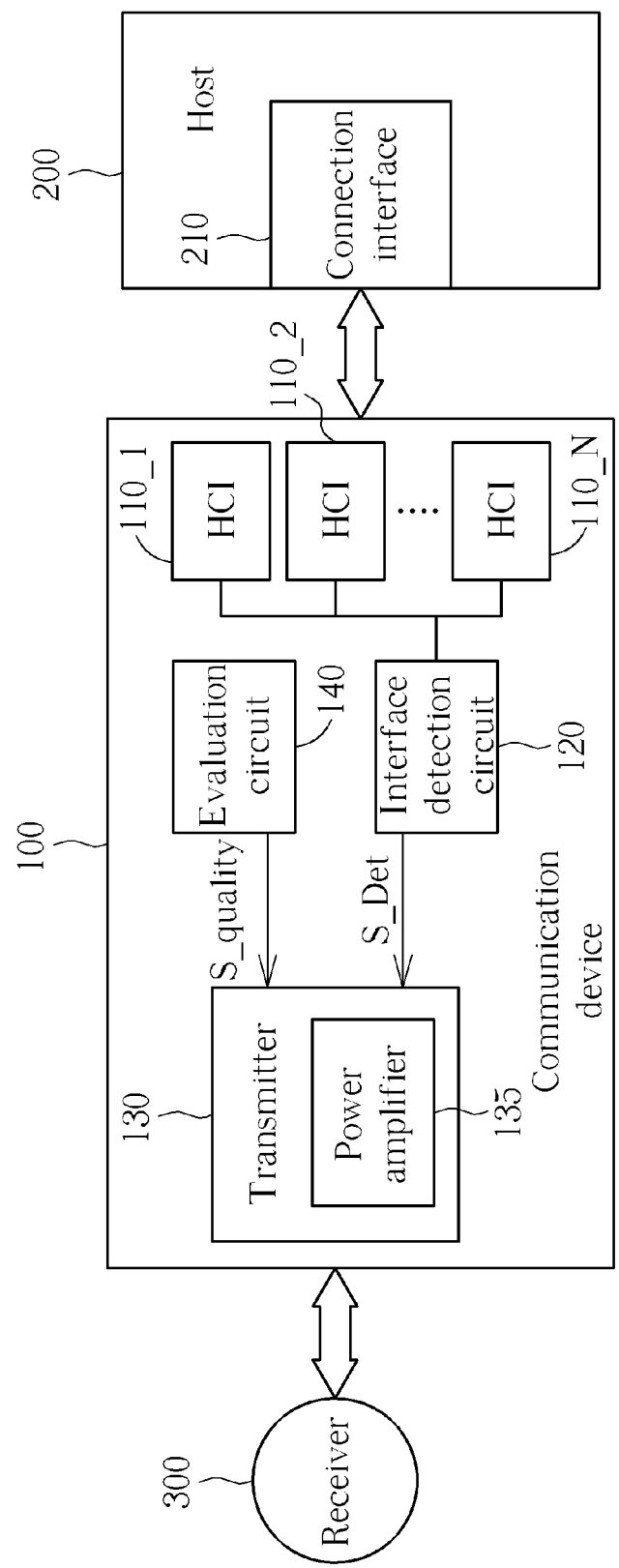
FIG. 1 is a block diagram illustrating a communication device according to an embodiment of the present invention.

According to an embodiment of the present invention, a communication device is disclosed. Please refer to FIG. 1, which shows a communication device 100 including: a plurality of host control interfaces (HCIs) 110_1-110_N, an interface detector 120, and a transmitter 130. One of the host control interfaces 110_1-110_N is utilized for selectively connecting to a connection interface 210 of a host 200. The interface detector 120 is coupled to the host control interfaces 110_1-110_N, and is used to determine an interface specification of the interface 210 and accordingly generate a detection result S_Det. The transmitter 130 is coupled to the interface detector 120, and supports a plurality of transmission power levels. The transmitter 130 is used to determine a plurality of transmission configurations in accordance with the detection result S_Det and select one from the transmission configurations for data transmission with a receiver 300, wherein each of the transmission configurations determines a transmission power level configuration, and the transmission power level configuration mainly determines an average transmission power of a power amplifier 135 within the transmitter 130. It should be noted that the transmitter 130 may include multiple power amplifiers 135.

In one embodiment, the transmission configuration includes a plurality of configuration options listed in the following table. Each transmission configuration is used for configuring the transmitter 130 so as to achieve all kinds of transmission efficiencies required by different transmission specifications. Specifically, each transmission configuration includes the modulation type, the spatial stream number, the coding rate, and the transmission power level. Due to the different error tolerances of the modulation types, a higher-level modulation has a lower error tolerance (which is specified by an error vector magnitude (EVM) in dB). Hence, the maximum transmission power levels available for different modulations are not the same.

TABLE 1

| Modulation type | Coding rate | Spatial stream number | Transmission power level (dBm) | Error tolerance (dB) |
|---|---|---|---|---|
| BPSK | 1/2 | 1~N | <20 | −5 |
| QPSK | 1/2 | 1~N | <19 | −10 |
| QPSK | 3/4 | 1~N | <18 | −13 |
| 16-QAM | 1/2 | 1~N | <16 | −16 |
| 16-QAM | 2/3 | 1~N | <15 | −19 |
| 64-QAM | 2/3 | 1~N | <14 | −22 |
| 64-QAM | 3/4 | 1~N | <13 | −25 |
| 64-QAM | 5/6 | 1~N | <12 | −27 |
| 256-QAM | 3/4 | 1~N | <11 | −30 |
| 256-QAM | 5/6 | 1~N | <10 | −32 |

Since the transmitter 130 supports various configuration selections, a considerable number of configuration combinations may be utilized for configuring the transmitter 130. Therefore, the transmitter 130 determines usable transmission configurations based on the detection result S_Det, wherein the detection result S_Det indicates the interface specification and the permitted maximum power level of the connection interface 210 currently connected to the host 200. The transmitter 130 then selects usable transmission configurations from all combinations obtained from the table according to the power limit as defined by the interface specification. If the connection interface 210 of the host 200 is compatible with multiple interface specifications, the current operating interface specification will be regarded as the main one. For instance, when the connection interface 210 of the host 200 operates at the USB 3.0 mode, the power limit of the interface specification is 4.5 W. Hence, the transmitter 130 will select transmission configurations, each having the power consumption less than 4.5 W, from all possible configurations, and then select one from these selected transmission configurations to perform data transmission with the receiver 300. The selectivity of transmission configurations alters as the interface power limit changes. For instance, when the connection interface 210 of the host 200 operates at the USB 2.0 mode, the power limit of the interface specification is only 2.5 W. Therefore, the number of selectable transmission configurations of the connection interface 210 operating at the USB 2.0 mode is smaller than that of the connection interface 210 operating at the USB 3.0 mode. In addition, since the spatial stream number directly determines the number of power amplifiers. Thus, when the transmission configuration has a larger spatial stream number included therein, the transmitter 130 is only allowed to choose a lower transmission power level to configure the power amplifier 135 for satisfying the power limit of the connection interface 210.

In this embodiment, the transmission device 100 further includes an evaluation circuit 140 used to generate a evaluation result S_quality according to the channel quality between the transmitter 130 and the receiver 300. The transmitter 130 further selects one from the previously selected transmission configurations according to the evaluation result S_quality for data transmission with the receiver 300. The transmitter 130 selects the most appreciate transmission configuration according to the evaluation result S_quality indicative of the channel quality. Generally speaking, a lot of parameters may be utilized for evaluating the channel quality. One convenient and direct choice for the transmission end is the retry ratio. Therefore, if the transmitter 130 finds that the current retry ratio is high by referring to the evaluation result S_quality, the transmitter 130 will select a transmission configuration which can reduce the retry ratio from the transmission configurations determined by the detection result S_Det. For instance, in the previous process, the transmission configurations selected by the transmitter 130 according to the detection result S_Det are listed as follows.

| Modulation type | Coding rate | Spatial stream number | Transmission power level (dBm) | Error tolerance (dB) |
|---|---|---|---|---|
| BPSK | 1/2 | 1~4 | <16 | −5 |
| QPSK | 1/2 | 1~4 | <16 | −10 |
| QPSK | 3/4 | 1~4 | <16 | −13 |
| 16-QAM | 1/2 | 1~4 | <16 | −16 |
| 16-QAM | 2/3 | 1~4 | <15 | −19 |
| 64-QAM | 2/3 | 1~4 | <14 | −22 |
| 64-QAM | 3/4 | 1~4 | <13 | −25 |
| 64-QAM | 5/6 | 1~4 | <12 | −27 |
| 256-QAM | 3/4 | 1~4 | <11 | −30 |
| 256-QAM | 5/6 | 1~4 | <10 | −32 |

Therefore, the transmitter 130 may employ the following transmission configuration due to a higher transmission rate and a higher maximum transmission power level.

| Modulation type | Coding rate | Spatial stream number | Transmission power level (dBm) | Error tolerance (dB) |
|---|---|---|---|---|
| 16-QAM | 1/2 | 1~4 | <16 | −16 |

In addition, if the retry ratio is relatively high or even poor after the transmitter 130 is configured with the above transmission configuration, then the transmitter 130 may switch to a lower-level modulation type for data transmission until a better and acceptable retry ratio is obtained. For example, the transmitter 130 may employ the following transmission configuration.

| Modulation type | Coding rate | Spatial stream number | Transmission power level (dBm) | Error tolerance (dB) |
|---|---|---|---|---|
| BPSK | 1/2 | 1~4 | <16 | −5 |
| QPSK | 1/2 | 1~4 | <16 | −10 |
| QPSK | 3/4 | 1~4 | <16 | −13 |

The reason is the low level modulation type permits higher maximum transmission power level, which reduces the retry ratio efficiently.

In addition to the above-mentioned retry ratio, the channel quality may be determined according to at least one of the following parameters: the receive signal strength indicator (RSSI), the signal-to-noise ratio (SNR), the error vector measurement, the channel state information (CSI), the packet error rate (PER), and the bit error rate (BER). Besides, though the above-mentioned transmission configurations have specific modulation types, coding rates, spatial stream numbers and transmission power levels, those are for illustrative purposes only, but not limitations of the present invention.

In one embodiment of the present invention, the transmitter 130 determines a plurality of pre-defined transmission configurations in advance before referring to the detection result S_Det to determine the selected transmission configurations, wherein the transmitter 130 may select the pre-defined transmission configurations in accordance with a transmission rate determined by the interface specification of the transmission interface 210 of the host 200. For instance, as specified in the USB 3.0 specification, the maximum interface transmission speed is 5 Gbps; hence the transmitter 130 selects transmission configurations, each having the transmission speed lower than 5 Gbps, from the pre-defined transmission configurations. In this way, the efficiency of determining the transmission configuration is improved, and a register overflow problem encountered by the host 200 while the host 200 is receiving data from the communication device 100 can be avoided.

Furthermore, the transmitter 130 may determine the pre-defined transmission configurations in advance due to other reasons, such as the overall power consumption of the internal components of the communication device 100 (e.g., the power consumption of the transmitter 130, the power amplifier 135, the evaluation circuit 140, or the interface detector 120. Since the above-mentioned parameters are already known before the transmitter 130 starts the data transmission, the transmitter 130 can exclude those transmission configurations which make the overall power consumption of the communication device 100 exceed the power limits of all the host control interface HCI 110_1-110_N beforehand. In other words, the transmission configurations making the power consumption of the communication device 100 exceed the limit are screened out prior to obtaining the detection result S_Det. In this way, the transmission configurations not making the power consumption of the communication device 100 exceed the limit are selected. Moreover, the system-level power consumption limit may also be one of the factors referenced for determining the pre-defined transmission configurations. For example, when the host 200 operates in a standby mode or a Wake-on-LAN mode, the power limit of the host 200 will become lower compared with the normal operation mode. Hence, the communication device 100 has to reduce its power consumption in this situation. The transmitter 130 also excludes those transmission configurations which make the overall power consumption of the communication device 100 exceed the power limit for the standby mode or the Wake-on-LAN mode beforehand.

In different embodiments of the present invention, the host control interfaces 110_1-110_N may include transmission interfaces designed based on various interface specifications for improving the compatibility of the communication device 100. For instance, in one embodiment, the host control interfaces 110_1-110_N include a plurality of host control interfaces corresponding to different generations of the PCI-E standard. Therefore, the communication device 100 is compatible with host connection interfaces corresponding to different generations of the PCI-E standard. In another embodiment, the host control interfaces 110_1-110_N may include a plurality of host control interfaces corresponding to different generations of the USB standard. In yet another embodiment, the host control interfaces 110_1-110_N may include a plurality of host control interfaces corresponding to different generations of the secure digital input/output (SDIO) standard. In addition, instill yet another embodiment, the host control interfaces 110_1-110_N may include a plurality of host control interfaces corresponding to different standards (e.g., the PCI-E standard, the USB standard and the SDIO standard), thus making the communication device 100 compatible with a wider range of host connection interfaces. Please note that the above-mentioned interface standards are not meant to be limitations of the present invention. After reading the above description, those skilled in the art should readily appreciate that the present invention can be applied to any other interface standard. These alternative designs all belong to the scope of the present invention.

Figure 2:
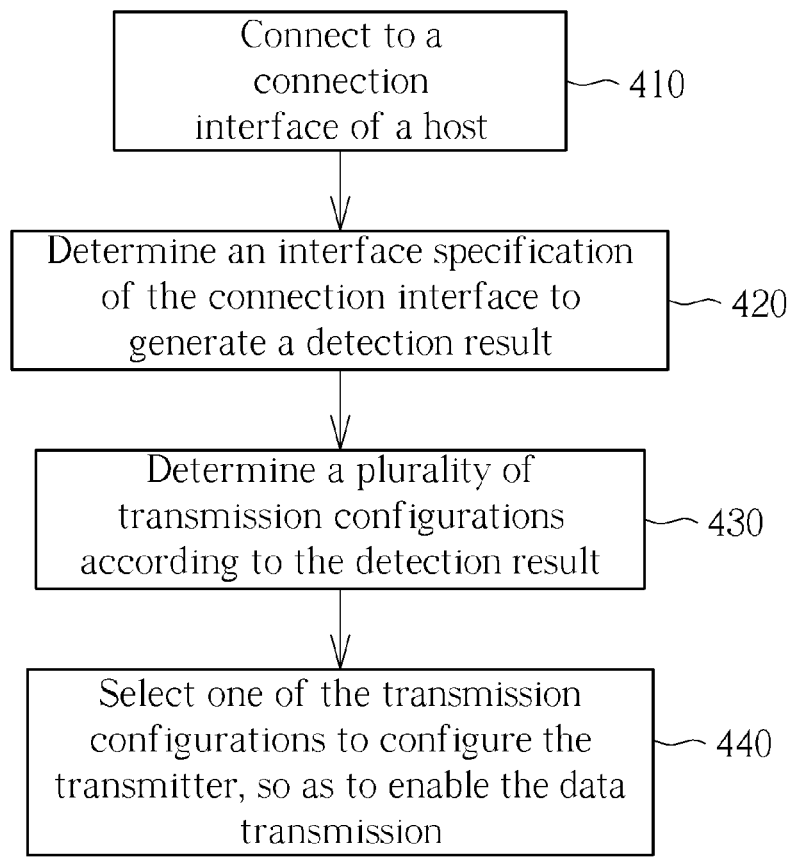
FIG. 2 is a flowchart illustrating a method for configuring data transmission according to an embodiment of the present invention.

Based on the above-mentioned communication device, a method for configuring data transmission is disclosed according to another embodiment of the present invention. The method may be used for configuring data transmission process of a transmitter. Please refer to FIG. 2, which is a flowchart illustrating the method for configuring data transmission according to an embodiment of the present invention. First of all, in step 410, the transmitter is connected to a connection interface of a host. After that, an interface specification of the connection interface is determined to generate a detection result in step 420. Then, a plurality of transmission configurations will be determined according to the detection result in step 430, wherein the transmission configurations are used for configuring a transmitter to support a plurality of transmission power levels, respectively. Next, in step 440, one of the transmission configurations will be selected to configure the transmitter, so as to enable the data transmission between the transmitter and a receiver. In one embodiment, each transmission configuration determines at least a transmission power level setting of the transmitter. Since the principle and operation of each step are described in the above paragraphs, the details are omitted here for brevity.

According to an embodiment of the present invention, the method for configuring data transmission may further include: Step 450: Generate an evaluation result according to channel quality between the transmitter and the receiver. Step 450 can be inserted into any two steps of the flowchart shown in FIG. 2. Thus, one of the transmission configurations will be selected to perform data transmission according to the examination result in step 440.

Figure 3:
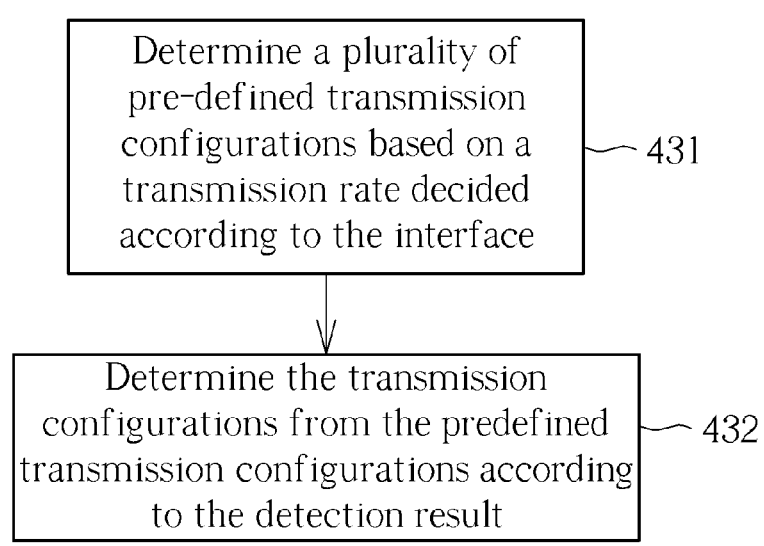
FIG. 3 is a flowchart illustrating the method for determining transmission configurations according to an embodiment of the present invention.

According to another embodiment of the present invention, step 430 may include sub-steps 431 and 432 shown in FIG. 3.

Sub-step 431: Determine a plurality of pre-defined transmission configurations based on a transmission rate decided according to the interface specification; and Sub-step 432: Determine the transmission configurations from the predefined transmission configurations according to the detection result.

Figure 4:
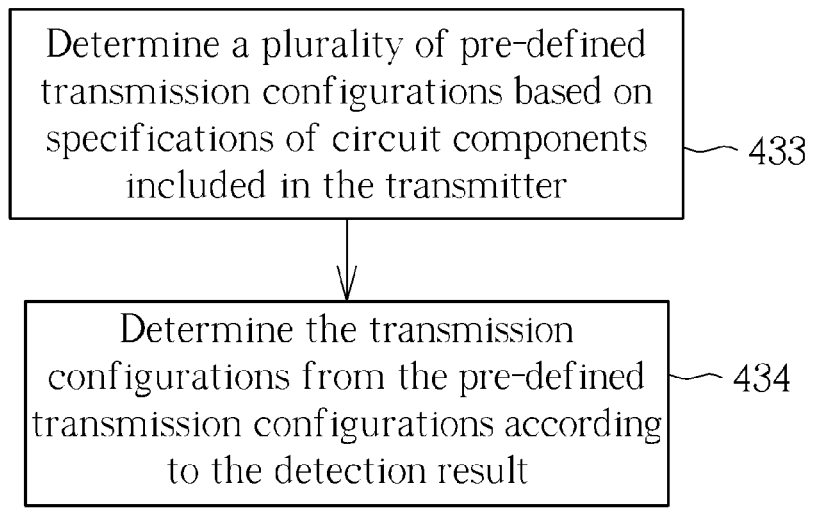
FIG. 4 is another flowchart illustrating the method for determining transmission configurations according to an embodiment of the present invention.

According to yet another embodiment of the present invention, step 430 may include sub-steps 433 and 434 shown in FIG. 4.

Sub-step 433: Determine a plurality of pre-defined transmission configurations based on specifications of circuit components included in the transmitter; and Sub-step 434: Determine the transmission configurations from the pre-defined transmission configurations according to the detection result.

Figure 5:
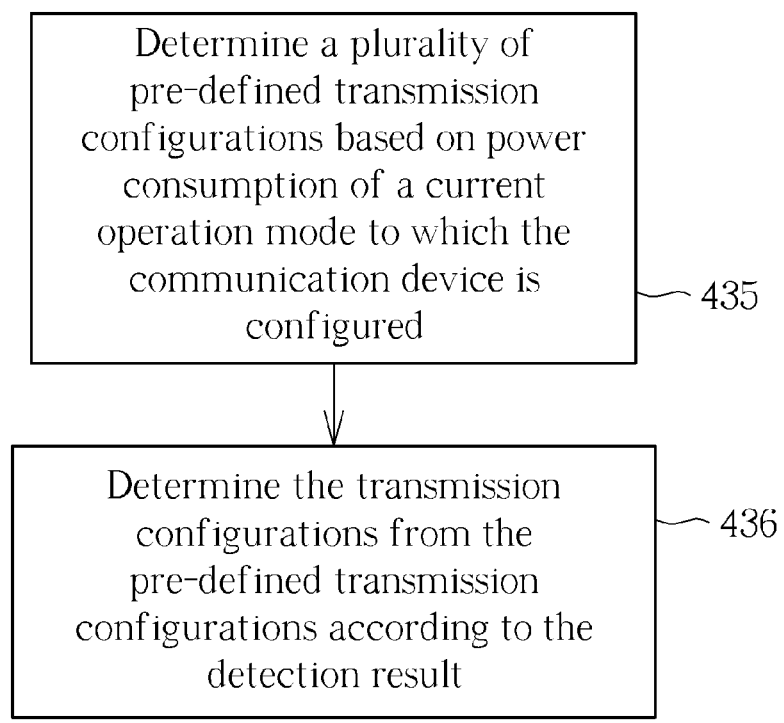
FIG. 5 is yet another flowchart illustrating the method for determining transmission configurations according to an embodiment of the present invention.

According to still yet another embodiment of the present invention, step 430 may include sub-steps 435 and step 436 shown in FIG. 5.

Sub-step 435: Determine a plurality of pre-defined transmission configurations based on power consumption of a current operation mode to which the communication device is configured, wherein operation modes of the communication device may include the standby mode and the Wake-on-LAN mode; and Sub-step 436: Determine the transmission configurations from the pre-defined transmission configurations according to the detection result.

Since the principle and operation of each step of the present invention are similar to those of the communication device described above, the details are omitted here for brevity. Moreover, in different embodiments of the present invention, the interface specification may correspond to the PCI-E, the USB or the SDIO.

The disclosed invention allows the communication device to comply with power consumption requirements of various interface specifications, and also achieves the objective of optimizing transmission speed and transmission power of the communication device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:
a plurality of host control interfaces, configured to selectively connect to a connection interface of a host, wherein only one of the host control interfaces is connected to the host at a time;
an interface detector, coupled to the host control interfaces, the interface detector configured to determine an interface specification of the connection interface to generate a detection result indicating a permitted maximum power level of the connection interface; and
a transmitter, coupled to the interface detector supporting a plurality of transmission power levels, the transmitter configured to determine a plurality of transmission configurations according to the permitted maximum power level of the connection interface and selecting one from the transmission configurations for data transmission with a receiver that is not part of the host and not part of the communication device, wherein each transmission configuration determines a transmission power level configuration of the transmitter;
wherein the transmitter supports at least one modulation type, at least one encoding rate, and at least one spatial stream number; and each transmission configuration further determines a spatial stream number configuration and at least one of a modulation type configuration and an encoding rate configuration; the communication device further comprising:
an evaluation circuit, arranged for generating an evaluation result according to channel quality between the transmitter and the receiver, wherein the transmitter additionally refers to the evaluation result for selecting one from the transmission configuration to perform the data transmission.

2. The communication device of claim 1, wherein the transmitter determines the transmission configurations from a plurality of pre-defined transmission configurations according to the detection result, and the pre-defined transmission configurations are determined based on a transmission rate decided according to the interface specification.

3. The communication device of claim 1, wherein the transmitter determines the transmission configurations from a plurality of pre-defined transmission configurations according to the detection result, and the pre-defined transmission configurations are determined based on specifications of circuit components included in the communication device.

4. The communication device of claim 1, wherein the transmitter determines the transmission configurations from a plurality of pre-defined transmission configurations according to the detection result, and the pre-defined transmission configurations are determined based on power consumption of a current operation mode to which the communication device is configured.

5. The communication device of claim 1, wherein the host control interfaces includes a plurality of first host control interfaces corresponding to different generations of Peripheral Component Interconnect Express (PCI-E) standard.

6. The communication device of claim 1, wherein the host control interfaces includes a plurality of second host control interfaces corresponding to different generations of Universal Serial Bus (USB) standard.

7. The communication device of claim 1, wherein the host control interfaces includes a plurality of third host control interfaces corresponding to different generations of Secure Digital Input/Output (SDIO) standard.

8. The communication device of claim 1, wherein the host control interfaces includes a plurality of fourth host control interfaces corresponding to Peripheral Component Interconnect Express (PCI-E) standard, Universal Serial Bus (USB) standard and Secure Digital Input/Output (SDIO) standard.

9. A method for configuring data transmission, comprising:
connecting to a connection interface of a host;
determining an interface specification of the connection interface to generate a detection result indicating a permitted maximum power level of the connection interface;
determining a plurality of transmission configurations according to the permitted maximum power level of the connection interface, wherein the transmission configurations are used to configure a transmitter supporting a plurality of transmission power levels; and
selecting one from the transmission configurations to configure the transmitter to enable the data transmission between the transmitter and a receiver that is not part of the host and not part of a communication device in which the transmitter is disposed, wherein each transmission configuration determines a transmission power level configuration of the transmitter;

wherein the transmitter supports at least one modulation type, at least one encoding rate, and at least one spatial stream number; and each transmission configuration further determines a spatial stream number configuration and at least one of a modulation type configuration and an encoding rate configuration;

the method further comprising:

generating an evaluation result according to channel quality between the transmitter and the receiver; and the step of selecting one from the transmission configurations comprising:

additionally referring to the evaluation result to select one from the transmission configurations to perform the data transmission.

10. The method of claim 9, wherein the step of generating the evaluation result according to the channel quality between the transmitter and the receiver comprises:

generating the evaluation result according to at least one of the following parameters: a retry ratio calculated by the transmitter, and a receive signal strength indicator, a signal to noise ratio, an error vector measurement, a channel state information, a packet error rate and a bit error rate calculated by the receiver.

11. The method of claim 9, wherein the step of determining the plurality of transmission configurations according to the detection result comprises:

determining a plurality of pre-defined transmission configurations based on a transmission rate decided according to the interface specification; and determining the transmission configurations from the pre-defined transmission configurations according to the detection result.

12. The method of claim 9, wherein the step of determining the plurality of transmission configurations according to the detection result comprises:

determining a plurality of pre-defined transmission configurations based on specifications of circuit components included in the transmitter; and determining the transmission configurations from the pre-defined transmission configurations according to the detection result.

13. The method of claim 9, wherein the step of determining the plurality of transmission configurations according to the detection result comprises:

determining a plurality of pre-defined transmission configurations based on power consumption of a current operation mode to which the communication device is configured; and determining the transmission configurations from the pre-defined transmission configurations according to the detection result.

14. The method of claim 9, wherein the interface specification corresponds to Peripheral Component Interconnect Express (PCI-E) standard.

15. The method of claim 9, wherein the interface specification corresponds to Universal Serial Bus (USB) standard.

16. The method of claim 9, wherein the interface specification corresponds to Secure Digital Input/Output (SDIO) standard.

17. The communication device of claim 1, wherein the evaluation circuit generates the evaluation result according to at least one of the following parameters: a retry ratio calculated by the transmitter, and a receive signal strength indicator, a signal-to-noise ratio, an error vector measurement, a channel state information, a packet error rate and a bit error rate calculated by the receiver.

* * * * *